(12) United States Patent
Foessel

(10) Patent No.: US 7,266,477 B2
(45) Date of Patent: Sep. 4, 2007

(54) METHOD AND SYSTEM FOR SENSOR SIGNAL FUSION

(75) Inventor: Alex Dietrich Foessel, Rancho Palos Verdes, CA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/158,546

(22) Filed: Jun. 22, 2005

(65) Prior Publication Data

US 2007/0005306 A1    Jan. 4, 2007

(51) Int. Cl.
*G01S 5/00* (2006.01)
*G06F 17/10* (2006.01)
*G06F 17/00* (2006.01)

(52) U.S. Cl. .................. 702/189; 340/436; 382/100; 382/103; 701/1; 701/300; 701/301; 702/127

(58) Field of Classification Search ............... 340/436, 340/945, 952, 954, 961, 988; 342/29, 52, 342/53, 54, 56, 159; 382/100, 103; 701/1, 701/300, 301; 702/127, 150, 189, 190, 191
See application file for complete search history.

(56) References Cited

U.S. PATENT DOCUMENTS

| 2,994,080 | A | * | 7/1961 | Varela | 342/94 |
| 3,076,189 | A | * | 1/1963 | Goddard | 342/52 |
| 3,076,961 | A | * | 2/1963 | Bibbero | 342/53 |
| 3,501,762 | A | * | 3/1970 | Klees | 342/53 |
| 5,023,444 | A | | 6/1991 | Ohman | 250/221 |

(Continued)

FOREIGN PATENT DOCUMENTS

WO    WO 2004/111938 A    12/2004

OTHER PUBLICATIONS

Kim, Seong-Baek et al. An Advanced Approach for Navigation and Image Sensor Integration for Land Vehicle Navigation. 2004 IEEE 60th Vehicular Technology Conference. VTC2004-Fall (IEEE CAT. No. 04CH37575) IEEE Piscataway, NJ, vol. 6, 2004, pp. 4075-4078.

(Continued)

*Primary Examiner*—Edward R Cosimano

(57) ABSTRACT

The first sensor collects a first group of first sensor readings of first fixed size dependent on a range of a first sensor and safeguarding requirements of a vehicle. A second sensor collects a second group of second sensor readings of second fixed size dependent on a range of a second sensor and the safeguarding requirements. A reference frame manager references the first group and the second group of readings to a vehicle coordinate reference frame. An integration module establishes a composite grid referenced to the ground based on a spatially aligned integration of the readings of the first group and the second group. A update module refreshes the composite grid upon material movement of the vehicle such that the global occupancy of each cell in the composite grid varies in accordance with the particular location of the vehicle on the terrain.

26 Claims, 8 Drawing Sheets

U.S. PATENT DOCUMENTS

| | | | | |
|---|---|---|---|---|
| 5,529,138 | A | * | 6/1996 | Shaw et al. ............... 180/169 |
| 5,913,919 | A | | 6/1999 | Bauer et al. |
| 6,597,987 | B1 | | 7/2003 | Barton |
| 6,674,687 | B2 | | 1/2004 | Zeitzew ........................ 367/6 |
| 6,721,659 | B2 | * | 4/2004 | Stopczynski ............... 701/301 |
| 6,738,721 | B1 | | 5/2004 | Drucke et al. ............... 702/95 |
| 6,903,677 | B2 | * | 6/2005 | Takashima et al. ........... 342/70 |
| 7,065,465 | B2 | * | 6/2006 | Chen et al. ................. 702/116 |
| 7,102,496 | B1 | * | 9/2006 | Ernst et al. ................ 340/436 |
| 7,136,726 | B2 | * | 11/2006 | Greenfeld et al. ............. 701/3 |
| 2003/0149530 | A1 | * | 8/2003 | Stopczynski ............... 701/301 |
| 2003/0186663 | A1 | * | 10/2003 | Chen et al. .............. 455/226.3 |
| 2004/0189512 | A1 | * | 9/2004 | Takashima et al. ........... 342/70 |
| 2005/0131581 | A1 | | 6/2005 | Sabe et al. |

OTHER PUBLICATIONS

Elfes, Alberto. Using Occupancy Grids for Mobile Robot Perception and Navigation. Computer, IEEE Service Center, Los Alamitos, CA, vol. 22, No. 6, Jun. 1, 1989. pp. 46-57.

Coue, C. et al. Multi-Sensor Data Fusion Using Bayesian Programming: an Automotive Application. Proceedings of the 2002 IEEE/RSJ International Conference on Intelligent Robots and Systems. (IROS 2002). Lausanne, Switzerland, Sep. 30-Oct. 4, 2002, IEEE/RSJ International Conference on Intelligent Robots and Systems, New York, NY: IEEE, US, vol. 1 of 3, Sep. 30, 2002, pp. 141-146.

Young E. et al. Improved Obstacle Detection by Sensor Fusion. IEE Colloquium On Prometheus and Drive (Digest No. 172), 1992, pp. 2/1-2/6.

Ma, Bing et al. A Robust Bayesian Multisensor Fusion Algorithm For Joint Lane And Pavement Boundary Detection. Proceedings 2001 International Conference on Image Processing, ICIP 2001. Thessaloniki, Greece, Oct. 7-10, 2001, International Conference on Image Processing, New York, NY, IEEE, US, vol. 1 of 3, Conf. 8, Oct. 7, 2001, pp. 762-765.

Coue, C. et al. Using Bayesian Programming for Multi-Sensor Multi-Target Tracking in Automotive Applications. Proceedings of the 2003 IEEE International Conference on Robotics and Automation. ICRA 2003. Taipei, Tawan, Sep. 14-19, 2003, Proceedings of the IEEE International Conference on Robotics and Automation. New York, NY, IEEE, US, vol. 1 of 3, Sep. 14, 2003, pp. 2104-2109.

* cited by examiner

METHOD AND SYSTEM FOR SENSOR SIGNAL FUSION

FIELD OF THE INVENTION

This invention relates to a method and system for sensor signal fusion.

BACKGROUND OF THE INVENTION

If radar or sonar systems are individually used to provide a signal that represents the positions of obstacles near a vehicle, the output data may suffer from false positives of the presence of obstacles because of noise and clutter or misdetections because of the reflectivity and relative aspect of the obstacles with respect to the vehicle. If false positives of obstacles are present, the vehicle may expend additional computational resources in obstacle avoidance or may stop or slow down unnecessarily interfering with the efficient execution of a mission. Thus, there is a need to combine information from multiple sensors to improve the accuracy in the detection of the presence or absence of obstacles around a vehicle. Further, there is need to make the combined information available even when the absolute or global position of the vehicle is not known with certainty.

SUMMARY OF THE INVENTION

A system and a method for conducting sensor fusion supports reliable determinations of objects and obstacles around a vehicle based on filtered sensor inputs from multiple sensors. The first sensor collects a first group of first sensor readings of first size. A second sensor collects a second group of second sensor readings of second size. A reference frame manager references the first group and the second group of readings to a vehicle coordinate reference frame. An integration module establishes a composite grid referenced to the vehicle coordinate reference frame or the ground based on a spatially and temporally aligned integration of the readings of the first group and the second group. An update module refreshes the composite grid upon material movement of the vehicle such that the overall state (e.g., occupancy) of each cell in the composite grid varies in accordance with the particular location of the vehicle in the environment.

DESCRIPTION OF THE PREFERRED EMBODIMENT

Figure 1:
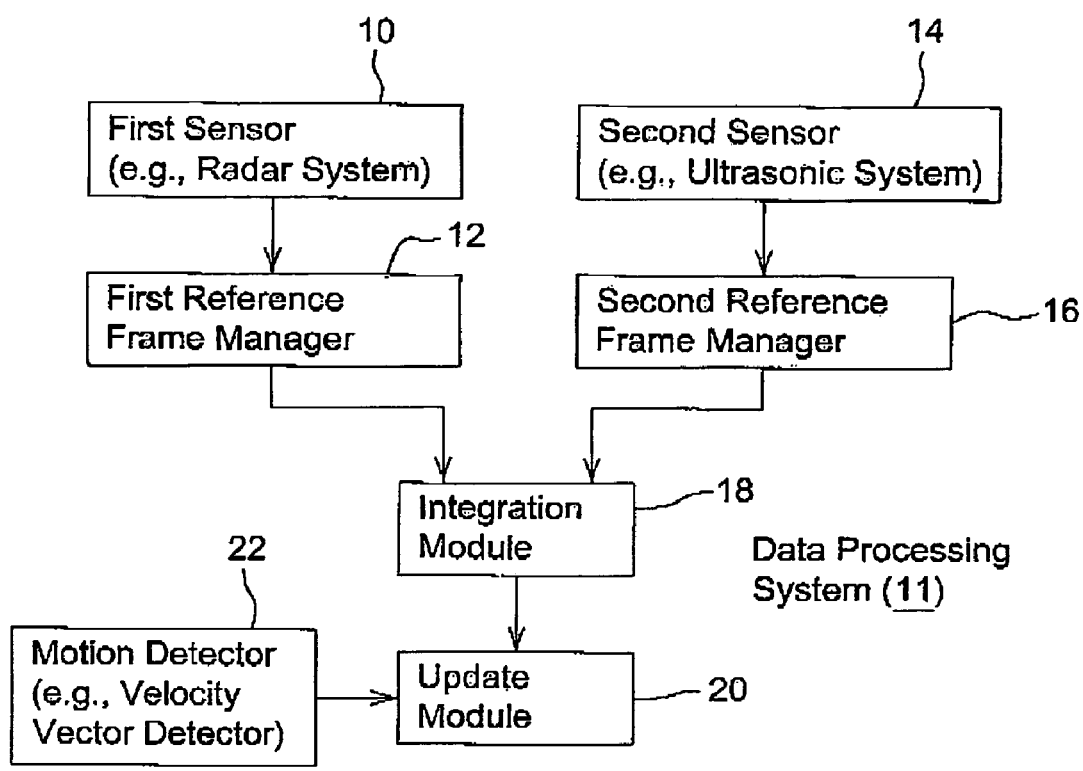
FIG. 1 is a block diagram of one embodiment of a system for sensor fusion.

In accordance with one embodiment of the invention, the data processing system 11 of FIG. 1 comprises a first sensor 10 coupled to a first reference frame manager 12 and a second sensor 14 coupled to a second reference frame manager 16. In turn, the first reference frame manager 12 communicates to an integration module 18; the second reference frame manager 16 communicates to the integration module 18. The integration module 18 and a motion detector 22 provide input data to an update module 20. The data processing system 11 is associated with or mounted on a vehicle.

In one illustrative configuration, the first sensor 10 comprises a radar system, whereas the second sensor 14 comprises an ultrasonic system. However, the first sensor 10, the second sensor 14, or both may comprise any suitable distance sensor or range finder. The first sensor 10 and the second sensor 14 each provide a data output or an output signal that is indicative of the distance (e.g., range) between the sensor (e.g., mounted on the vehicle) and a reflective object or obstacle. Further, the first sensor 10 and the second sensor 14 may provide an orientation or azimuth associated with the distance of the obstacle with respect to the vehicle. A control system or obstacle avoidance system can use the output data or signals of the data processing system 11 to avoid colliding with obstacles at certain distances and azimuths from the vehicle, for example.

The first sensor 10 and the second sensor 14 may each transmit a pulse at a transmission time. A reflected pulse may be reflected from a surface of an obstacle or obstruction and received at the first sensor 10, the second sensor 14, or both for processing at a reception time. An elapsed time between the transmission time of the transmission pulse and the reception time of the reflected pulse may be used to estimate the distance or range between the object and the vehicle because the elapsed time is proportional to the distance. Electromagnetic propagation generally propagates at approximately the speed of light. For example, the first sensor 10, the second sensor 14, or both may estimate the distance between the vehicle and the a detectable obstacle (e.g., with a surface having greater than a minimal reflectivity with respect to the transmission pulse) based on the following equation: distance=$(c*t)/2$, where $c=3\times10^8$ meters/seconds (speed of light), t=elapsed time or round trip propagation time, and distance is distance in meters.

The radar system may have a radar range and an associated radar beam width. Similarly, the ultrasonic system may have a ultrasonic range and an associated ultrasonic beam width. The radar range may be defined in terms of a maximum range or distance to a detectable obstacle (e.g., of minimum size and reflectivity), a minimum range or distance to an obstacle, or an azimuth range with respect to the obstacle. The ultrasonic range may be defined in terms of a maximum range or distance to a detectable obstacle (e.g., of minimum size and reflectivity), a minimum range to a detectable obstacle, or an azimuth range with respect to the obstacle. The radar beam width and the ultrasonic beam width may be defined in terms of degrees, for example, or a half power beam width.

The first reference frame manager 12 may comprise data storage for collecting and organizing each first group of first sensor readings associated with a corresponding time interval. In practice, the first sensor 10 collects a first group of sensor readings at regular time intervals. Each first group of the sensor readings may be identified by a unique time interval or time stamp for subsequent processing and retrieval. Although the first group may be modeled as virtual grid of cells, where each cell corresponds to a two or three dimensional spatial location (or location range) around the vehicle, the first group of readings may be organized as sets of coordinates (e.g., two or three dimensional coordinates) and associated readings (e.g., reflectivity, signal strength, or elapsed time).

The second reference frame manager 16 may comprise data storage for collecting and organizing each second group of second sensor 14 readings associated with a corresponding time interval. In practice, the second sensor 14 collects a second group of sensor readings at regular time intervals. Each second group of the sensor readings may be identified by a unique time interval or time stamp for subsequent processing and retrieval. Although the second group may be modeled as virtual grid of cells, where each cell corresponds to a two or three dimensional spatial location (or location range) around the vehicle, the second group of readings may be organized as sets of coordinates (e.g., two or three dimensional coordinates) and associated readings (e.g., reflectivity, signal strength, or elapsed time).

The integration module 18 generally spatially and temporally aligns the first group of sensor readings and the second group of sensor readings to determine a composite grid. The composite grid is referenced to a ground reference frame. In an alternate configuration, the composite grid or a precursor to the composite grid may be referenced to a vehicle coordinate reference frame.

The composite grid may be divided into cells, two-dimensional cells, cubic cells, or columns and rows. As used herein, a cell shall refer to a two-dimensional cell or a three-dimensional cell that is associated with a composite grid.

Each cell in the composite grid has a state. For example, each cell may have unoccupied state, an occupied state, a probability of occupancy, and a probability of nonoccupancy. A cell may have a state that represents occupancy, traversability, emptiness, or another binary random variable important for vehicle path planning, safety, trajectory control, speed, velocity, or acceleration. An unoccupied states means that the cell is not occupied by a detected obstacle. The occupied states means that the cell is occupied by a detected obstacle. The probability of occupancy defines a likelihood that the a given cell is occupied by an obstacle. The probability level may be expressed as a percentage value from zero percent to 100 percent, or otherwise.

The update module 20 may update or refresh the grid on a regular basis or upon material movement of the vehicle. For example, the update module 20 may refresh the composite grid upon material movement of the vehicle such that the overall state (e.g., occupancy or probability of occupancy) of each cell in the grid varies in accordance with the particular location (e.g., and heading) of the vehicle in the environment.

The motion detector 22 may provide a relative displacement (e.g., vectors or coordinates associated with corresponding measurement times) over a certain time interval to facilitate an update of the grid. The motion detector 22 may comprise one or more of the following: a location-determining receiver (e.g., a Global Positioning System (GPS) receiver), a GPS receiver with differential correction, an odometer, an accelerometer, a dead-reckoning positioning system, a radio frequency positioning system, a laser positioning system, and an optical positioning system. The location-determining receiver may output position data (e.g., geographic coordinates associated with corresponding measurement times, velocity vector data, or both). Velocity vector data may refer to speed and heading data. The motion detector 22 may determine the relative displacement of the occupancy detector based on a velocity, speed, or acceleration of the vehicle.

The dead-reckoning system may comprise the combination of a displacement sensor and a heading sensor. The displacement sensor measures the relative displacement of the vehicle, whereas the heading sensor measures the relative heading. The dead-reckoning system may output a traveled distance of the vehicle, a traveled direction of the vehicle, traveled distance versus time (e.g., vehicular speed), or vehicular velocity (e.g., speed and heading).

In one configuration, the dead-reckoning system comprises (1) an odometer or wheel revolution counter as the displacement sensor and (2) a gyroscope as the heading sensor. The odometer or wheel revolution counter may directly or indirectly count vehicular wheel revolutions or fractions thereof. The gyroscope may provide vehicle direction information or heading information. In another configuration, output of an accelerometer may be double-integrated to determine relative displacement of the vehicle, for example.

Figure 2:
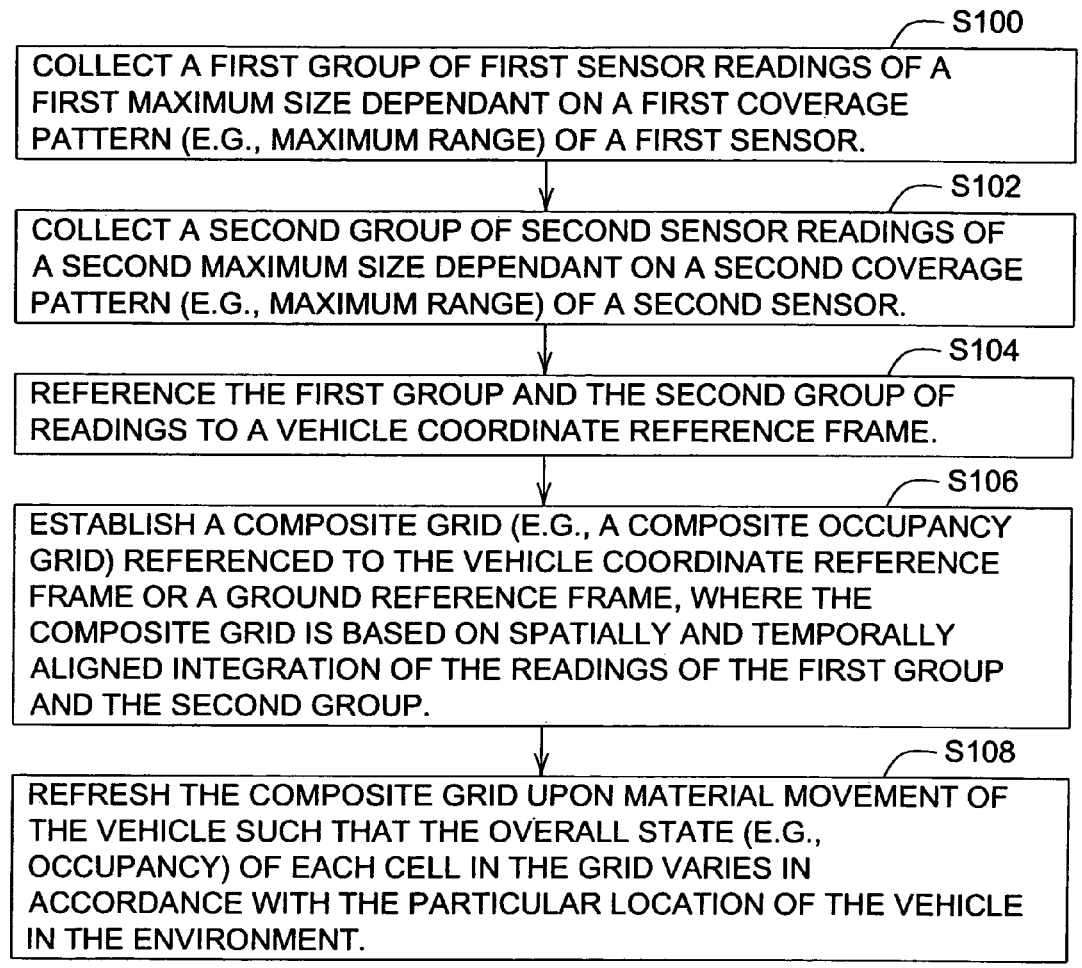
FIG. 2 is flow chart of one embodiment of a method for conducting sensor fusion.

FIG. 2 describes a method of conducting sensor fusion to facilitate vehicular guidance. The method of FIG. 2 begins in step S100.

In step S100, a first sensor 10 (e.g., a radar system) collects a first group of first sensor 10 readings of a first size. The first size may be dependent upon a maximum range of the first sensor 10, a coverage pattern of the first sensor 10, or safeguarding requirements of a vehicle. The range or coverage pattern of the first sensor 10 may be selected based on the safeguarding requirements of the vehicle, its maximum operational velocity, and other factors. The first sensor 10 readings are initially referenced to the orientation and position of the first sensor 10 on the vehicle. In one configuration, the first sensor 10 may collect a first group of first sensor readings (e.g., range and azimuth of various objects or obstacles in the coverage pattern) at regular intervals (e.g., sampling rate or periodic interval).

In step S102, a second sensor 14 (e.g., an ultrasonic system) collects a second group of second sensor 14 readings of a second size. The second size may be dependent upon a maximum range of the second sensor 14, a coverage pattern of the second sensor 14, or safeguarding requirements of a vehicle. The range or coverage pattern of the second sensor 14 may be selected based on the safeguarding requirements of the vehicle, its maximum operational velocity, and other factors. The second sensor 14 readings are initially referenced to the orientation and position of the second sensor 14 on the vehicle. In one configuration, the second sensor 14 may collect a first group of first sensor readings (e.g., range and azimuth of various objects or obstacles in the coverage pattern) at regular intervals (e.g., sampling rate or periodic interval).

In step S104, the first reference frame manager 12 and the second reference frame manager 16 reference the first group and the second group of readings to a vehicle coordinate reference frame. For example, for the first sensor 10 the first reference frame manager 12 may apply a first offset (e.g., two dimensional or three dimensional) or first correction factor that aligns the particular position and orientation of first sensor 10 to the vehicle coordinate reference frame. Similarly, for the second sensor 14 the second reference frame manager 16 may apply a second offset (e.g., two dimensional or three dimensional) or second correction factor that aligns the particular position and orientation of second sensor 14 to the vehicle coordinate reference frame.

In step S106, the integration module 18 establishes a composite grid referenced to the vehicle coordinate system or to ground (e.g., ground reference coordinates or absolute coordinates) based on a spatially and temporally aligned integration of the readings of the first group and the second group. In one configuration, if the first group and the second group of readings are organized as virtual grids (e.g., first virtual occupancy grid and the second virtual occupancy grid) the integration module 18 may integrate the first group and the second group of readings in accordance with a conditional probability approach, a Bayes rule approach, or a variation thereof. For example, in accordance with Bayes rule or variation thereof, each cell of a composite grid may be defined as the occurrence of a first event (e.g., an obstacle is present) associated with first sensor readings and the probability of occurrence (e.g., a certain percentage chance that an obstacle is present) of a second event associated with second sensor readings. Further, the first sensor readings may define a first virtual grid or matrix, whereas the second sensor readings may define a second virtual grid or matrix that can be temporally and spatially aligned with the first virtual grid for formation of the composite grid.

In step S106, the combination of information from different sensors and from various perspectives can help to avoid the susceptibility of generally wide sensor beams to noise and clutter. However, because the vehicle ordinarily moves around, the integration module 18 considers the relative displacement or motion between the different measurements. Here, the composite grid does not represent a global map with size dependent on the size of the work area, but rather a grid of limited size (e.g., local grid) that depends on the sensor range and safeguarding requirements. In particular, the size of the grid is based on the range and coverage of the first sensor 10 and the second sensor 14.

In step S108, the update module 20 refreshes or updates the composite grid upon material movement of the vehicle such that the overall state (e.g., occupancy) of each cell in the composite grid varies in accordance with the particular location of the vehicle in the environment. For example, the update module 20 refreshes the grid upon the sooner of material movement of the vehicle or a regular update interval. The regular update interval is used such that the vehicle can quickly recognize changes in the environment that might be caused by movement of obstacles or movement of new obstacles into the work area. The contents of the composite grid depend upon the vehicle position or orientation, and vary with changes in the vehicle position or orientation. The composite grid is referenced to the vehicle coordinate frame and remains stationary with respect to the vehicle coordinate frame at all times. However, the cell content of the composite grid is referenced to the ground. If the vehicle moves forward the composite grid scrolls the values of the cells in such a way that the cell value keeps representing the occupancy (or another metric) of that particular position of the vehicle on the terrain. Accordingly, the scrolling of the values facilitates integration of sensor data that is position coherent. In the case of vehicle rotation, or an azimuth shift the cell contents of the grid move from the original cell to the new cell representing the particular position.

Regardless of whether the vehicle moves a material amount to capture obstacle movement or new obstacle entry into the sensor coverage area, the update module 20 may refresh the values of composite grid (e.g., even from a stationary location) for the regular update interval (e.g., periodically) as frequently as a sampling rate of the first sensor 10, the second sensor 14, or both permit. In one embodiment, the update module may include, but need not include, a filter (e.g., a Bayes rule filter) that filters the values of the composite grid over time to reduce errors, and artifacts that otherwise might be present. Bayes rules defines a conditional probability that involves the occurrence of a first event and the probability of occurrence of a second event. Accordingly, the Bayes filter may be used to filter out or manipulate anomalous data that is inconsistent with a conditional probability relationship or historical patterns.

By reference to the grid, the vehicle controller or vehicle data processing system can traverse obstacle-free areas or cells and avoid obstacle-enriched areas or cells. Accordingly, a path planning system or vehicle data processing system may use the grid for planning vehicle trajectory of unmanned vehicles or to aid driver operations for a manned vehicle.

Figure 3:
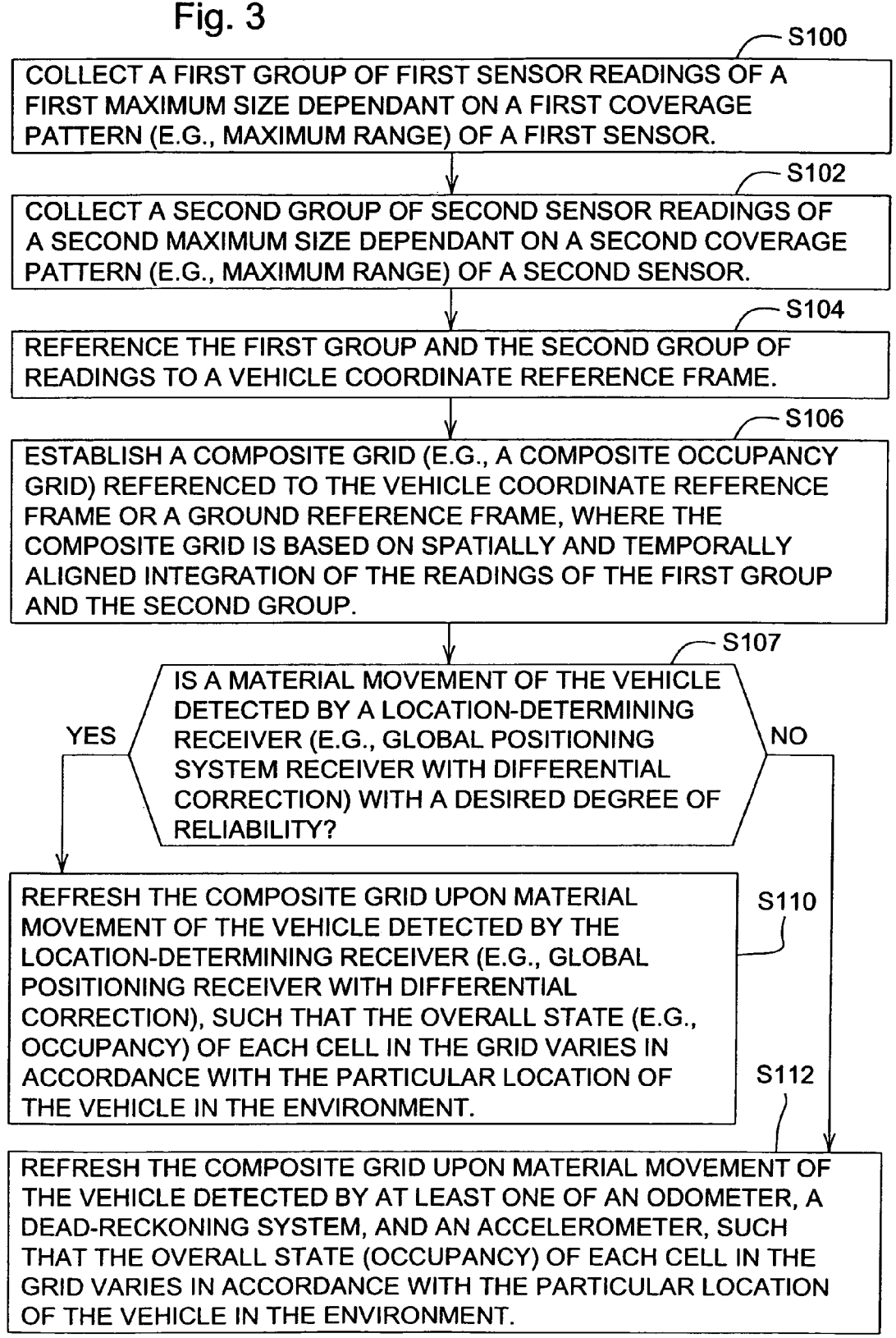
FIG. 3 is flow chart of another embodiment of a method for conducting sensor fusion.

The method of FIG. 3 is similar to the method of FIG. 2, except step S108 is replaced by steps S107, S110, and S112. Like reference numbers in FIG. 2 and FIG. 3 indicate like steps or procedures.

In step S107, a data processing system 11 or update module 20 determines whether a location determining receiver (e.g., a Global Positioning System Receiver with differential correction) detects a material movement (e.g., receive signals or received data on vehicular position versus time) of the vehicle with a desired degree of reliability. The material movement may comprise a distance or displacement vector that is a difference between starting coordinates of the vehicle and termination coordinates of the vehicle during an evaluation time period, where the difference is greater than or equal to some threshold. In one configuration, the threshold or material movement may be greater than or equal to a user defined measurement (e.g., 0.1 meters) or to some fraction of cell width, cell height or another cell dimension. The reliability of the detection of material movement or position may be expressed as a Dilution of Precision (DOP), a signal quality level of one or more received signals (e.g., satellite downlink signals) at the location-determining receiver, a signal strength level of one or more received signals (e.g., satellite downlink signals) at the location-determining receiver, or a bit error rate, symbol error rate or frame error rate of one or more received signals at the location-determining receiver, or the availability or unavailability of the location-determining receiver.

Dilution of Precision (DOP) is a representation (e.g., figure of merit) of the quality of a position data (e.g., GPS position data) which considers the relative locations of satellites and their geometric relationship to the location-determining receiver. In one example, the DOP may consider the number of satellites that are available (e.g., capable of being received with a reliable signal strength, a signal quality level, a maximum bit or symbol error rate) to a location-determining receiver from particular geographic coordinates of the location-determining receiver at a given time. Here, DOP may generally refer to any of the following: Position Dilution of Precision, Relative Dilution of Precision, Horizontal Dilution of Precision, Vertical Dilution of Precision, Time Dilution of Precision, and Geometric Dilution of Precision. Position Dilution of Precision refers to a DOP value for the particular three dimensional coordinates that indicates errors in satellite position and the errors in the location-determining receiver position. Relative Dilution of Precision provides an indication of the adequacy of observations of a location determining receiver during real-time surveying of measurements. Horizontal Dilution of Precision refers to DOP with respect to latitude and longitude measurements. Vertical dilution of precision refers to DOP with respect to height. Time Dilution of Precision refers to DOP with respect to temporal variations.

Because the location-determining receiver is detecting a material movement of the vehicle, the location-determining receiver should be sufficiently reliable during the period of the movement. If the location-determining receiver meets or exceeds a desired degree of reliability for detection of a material movement or position data of the vehicle, the method continues with step S110. However, if the location-determining receiver does not meet the desired degree of reliability for detection of a material movement or position data of the vehicle, the method continues with step S112.

In step S110, the update module 20 refreshes the composite grid upon material movement of the vehicle detected by the location-determining receiver (e.g., Global Positioning Receiver with differential correction), such that the overall state (e.g., occupancy) of each cell in the grid varies in accordance with the particular location of the vehicle in the environment. For example, the update module 20 refreshes the composite grid upon the expiration of a time interval (e.g., a regular time interval) or upon material movement of the vehicle, whichever occurs first; where the material movement is detected by the location-determining receiver (e.g., Global Positioning Receiver with differential correction), such that the overall state (e.g., occupancy) of each cell in the grid varies in accordance with the particular location of the vehicle in the environment.

The refreshing or updating of the composite grid in step S110 may be carried out in accordance with various techniques, which may be applied alternately or cumulatively. In accordance with a first technique, the material movement of the vehicle may be used to generate a new composite grid based on a new sample, a next sample, a new scan, a next scan, or updated collection of the first group of first sensor readings, the second group of second sensor readings, or both. In accordance with a second technique, the coverage area of the first sensor and the seconds sensor extend beyond the first composite grid and the data storage device associated with the integration module or update module allows updating without collection of new data. In accordance with a third technique, at least one of the update module 20, the first sensor 10, and the second sensor 14 determines the an update interval or an elapsed time period since the last update or sample time for collecting a first group of first sensor data and a second group of second sensor data.

In step S112, the update module 20 refreshes the composite grid upon material movement of the vehicle detected by at least one of an odometer, a dead-reckoning system, and an accelerometer, such that the overall state (e.g., occupancy) of each cell in the grid varies in accordance with the particular location of the vehicle in the environment. The material movement may comprise a distance or displacement vector that is a difference between starting coordinates of the vehicle and termination coordinates of the vehicle during an evaluation time period, where the difference is greater than or equal to some threshold. In one configuration, the threshold or material movement may be greater than or equal to a user defined measurement (e.g., 0.1 meters) or to some faction of cell width, cell height or another cell dimension.

Figure 4:
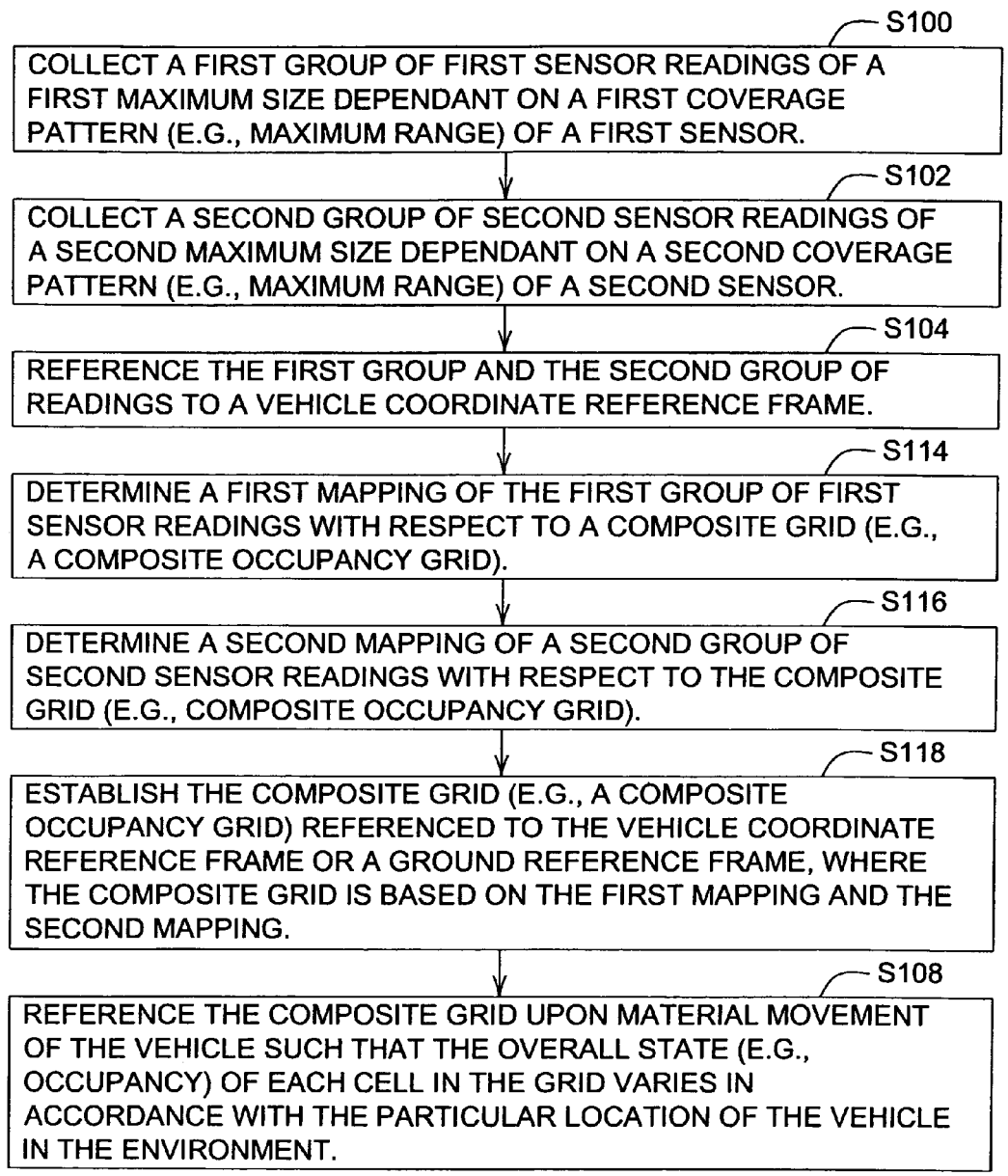
FIG. 4 is flow chart of yet another embodiment of a method for conducting sensor fusion.

The method of FIG. 4 is similar to the method of FIG. 2, except step S106 of FIG. 4 is replaced by step S114, S116, and S118. Like reference numbers indicate like method or procedures.

In step S114, an integration module 18 or a mapper determines a first mapping of the first group of first sensor 10 readings with respect to a composite grid (e.g., a composite occupancy grid). For example, upon initialization of the data processing system 11, including the integration module 18, the integration module 18 may determine the first mapping of the first group of first sensor readings with respect to the composite grid. By determining the first mapping in advance or upon initialization, the data processing or computation resources of the integration module 18 or data processing system 11 are fully available or less taxed for other data processing tasks associated with sensor fusion during operation of the vehicle.

In step S116, an integration module 18 a mapper determines a second mapping of the second group of second sensor 14 readings with respect to a composite grid (e.g., a composite occupancy grid). For example, upon initialization of the data processing system 11, including the integration module 18, the integration module 18 may determine the second mapping of the second group of second sensor readings with respect to the composite grid. By determining the second mapping in advance or upon initialization, the data processing or computation resources of the integration module 18 or data processing system 11 are fully available or less taxed for other data processing tasks associated with sensor fusion during operation of the vehicle.

In step S118, an integration module 18 establishes a composite grid (e.g., a composite occupancy grid) referenced to the vehicle coordinate reference frame or a ground reference frame, where the composite grid is based on the first mapping and the second mapping.

In FIG. 4, step S108 may follow step S118. In step S108, the update module 20 refreshes the composite grid upon material movement of the vehicle such that the overall state (e.g., occupancy) of each cell in the grid varies in accordance with the particular location of the vehicle in the environment.

Figure 5:
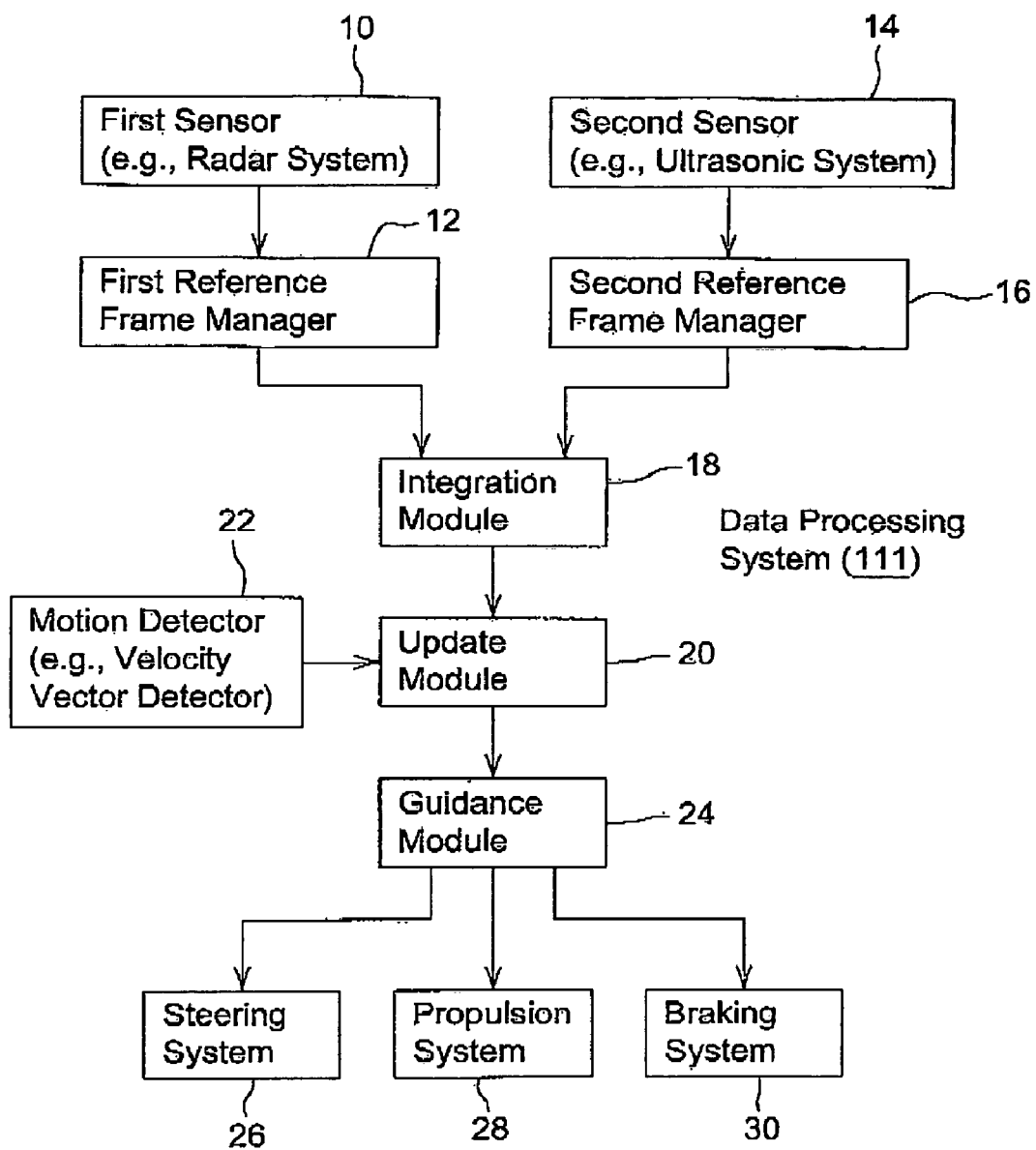
FIG. 5 is a block diagram of another embodiment of a system for sensor fusion.

The system 111 of FIG. 5 is similar to the data processing system 11 of FIG. 1, except the data processing system 111 of FIG. 5 further comprises a guidance module 24 coupled to the update module 20. In turn, the guidance module 24 may communicate with one or more of the following via a one or more logical or physical data paths: a steering system 26, a propulsion system 28, and a braking system 30. A physical data path may comprise a transmission line, or a databus, for example.

The guidance module 24 may generate control signals for the steering system 26, a braking system 30, and a propulsion system 28 that are consistent with the composite grid or occupancy states with the composite grid. For example, the control signals may comprise a steering control signal or data message that is time dependent and defines a steering angle of the steering shaft; a braking control signal or data message that defines the amount of deceleration, hydraulic pressure, or braking friction applied to brakes; a propulsion control signal or data message that controls a throttle setting, a fuel flow, a fuel injection system, vehicular speed or vehicular acceleration. If the vehicle is propelled by an electric drive or motor, the propulsion control signal or data message may control electrical energy, electrical current, or electrical voltage to the electric drive or motor.

The steering system 26 may comprise an electrically controlled hydraulic steering system, an electrically driven rack-and-pinion steering, an Ackerman steering system, or another steering system. The braking system 30 may comprise an electrically controlled hydraulic braking system, or another electrically controlled friction braking system. The propulsion system 28 may comprise an internal combustion engine, an internal combustion engine-electric hybrid system, an electric drive system, or the like.

Figure 6:
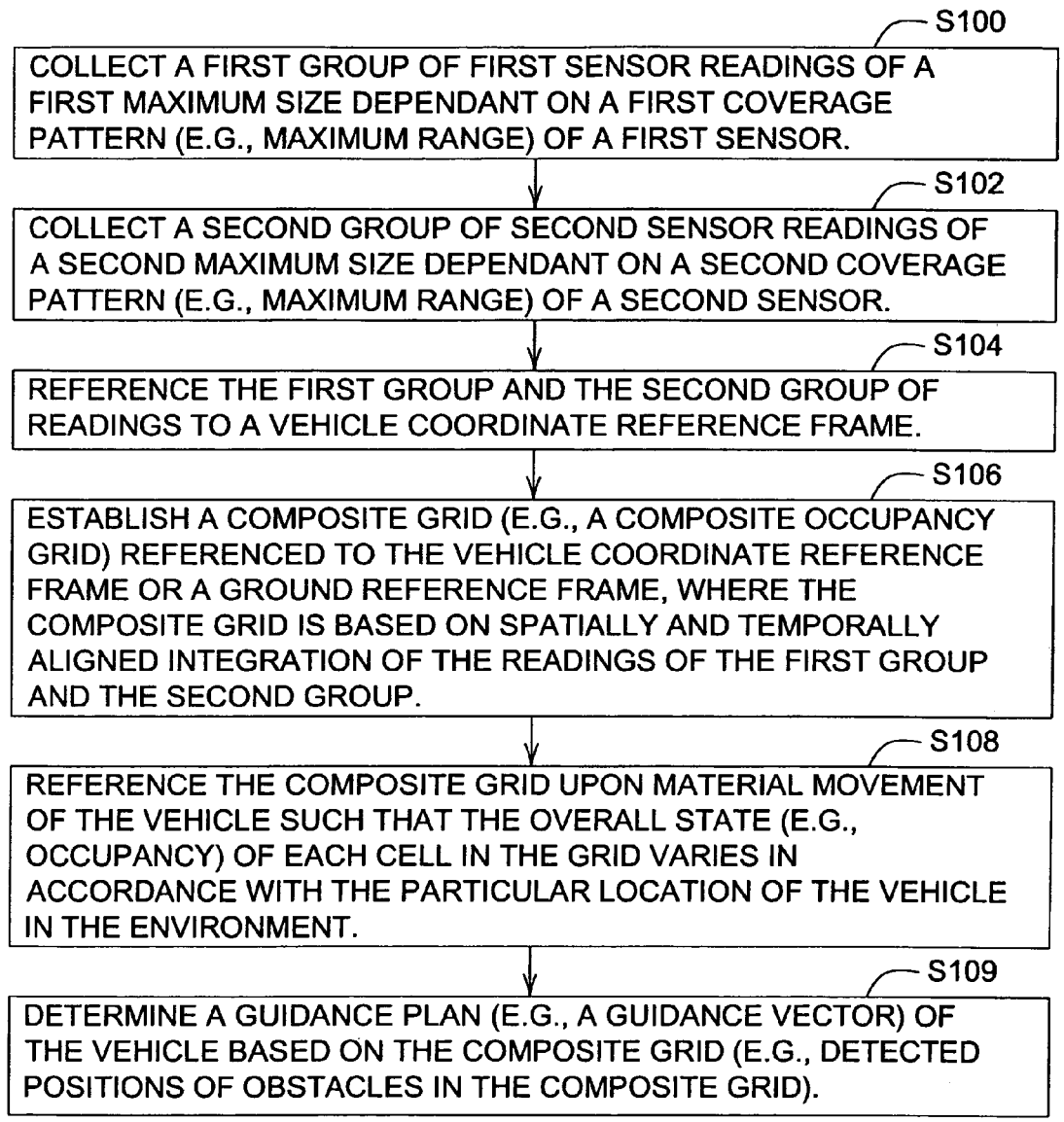
FIG. 6 is flow chart of a method for conducting sensor fusion and guiding a vehicle based on resultant sensor data.

The method of FIG. 6 is similar to the method of FIG. 2, except step S109 is added. Like reference numbers indicate like procedures or steps in FIG. 2 and FIG. 6.

Step S109 follows step S108. In step S109, a guidance module 24 determines a guidance plan (e.g., guidance vector) of the vehicle based on the composite grid (e.g., detected positions of obstacles in the composite grid). In one example, the guidance plan may avoid approaching an obstacle or a zone around the obstacle. In another example, the guidance module 24 establishes a plan that prohibits the vehicle from entering into cells occupied by the obstacle.

Figure 7:
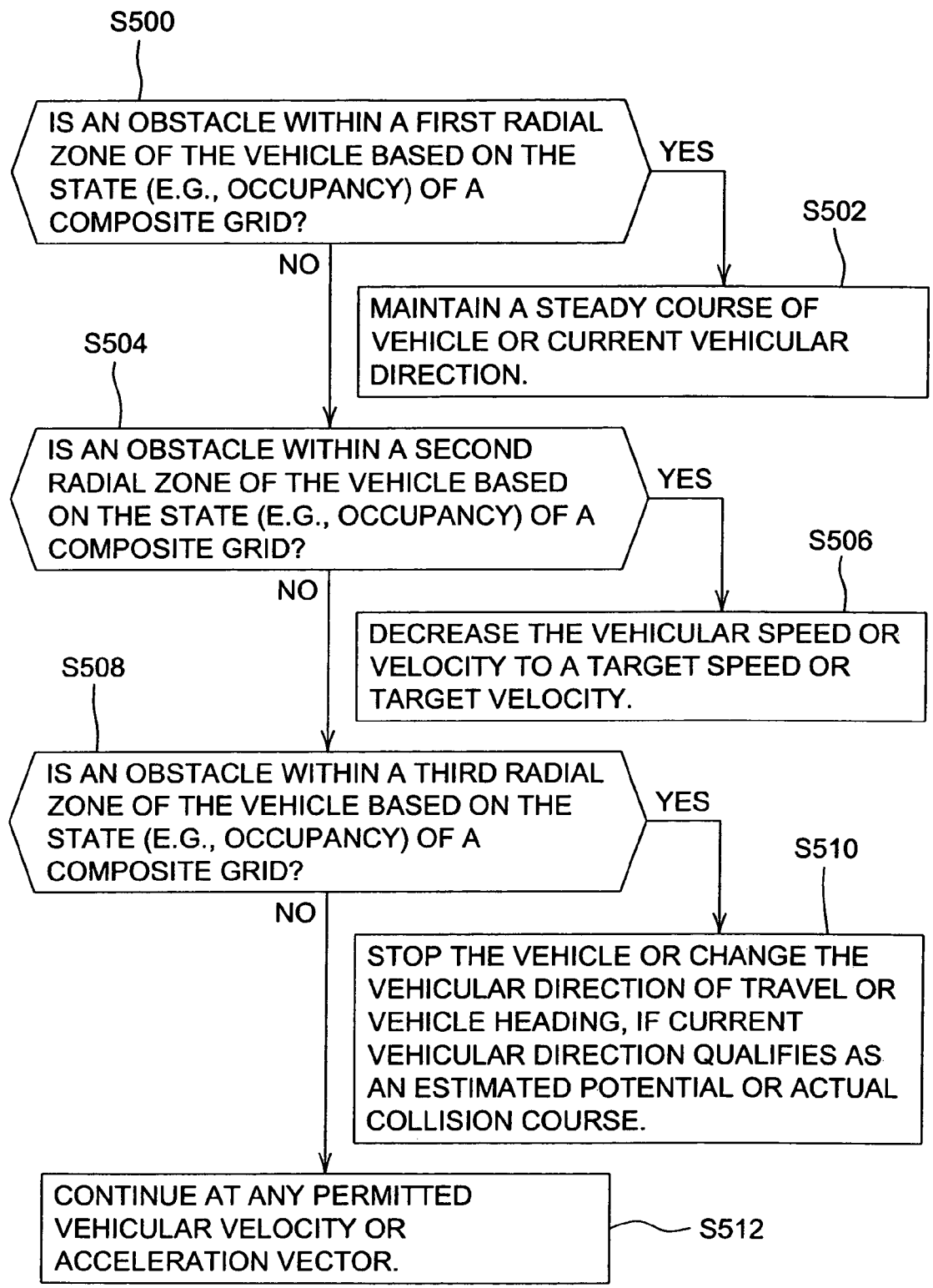
FIG. 7 is a flow chart of a method for guiding a vehicle that may be applied to any of the methods for conducting sensor fusion.

FIG. 7 provides a guidance plan of the vehicle that may be applied to any of the composite grids formed in accordance with any embodiments disclosed herein. For instance, the method of FIG. 7 may be regarded as an illustrative example for carrying out step S109 of FIG. 6.

In step S500, a guidance module 24 determines if an obstacle is within a first radial zone of the vehicle based on the state (e.g., occupancy) of a composite grid. The first radial zone may extend between an outer radius and an intermediate radius. If the obstacle is present within the first radial zone, the method continues with step S502. However, if the obstacle is not present within the first radial zone, the method continues with step S504.

In step S502, the guidance module 24 maintains a steady course or the current vehicle direction, at least until the next update of the composite grid. The maintenance of a steady course may include maintaining a current velocity and heading, for instance. In an alternative embodiment, the vehicle may change direction velocity or acceleration because of the preference of an operator, as opposed to the presence of an obstacle. The obstacle in the first radial zone is so far away from the vehicle that it poses virtually no risk of collision, imminent threat, or immediate interaction with the obstacle.

In step 504, a guidance module 24 determines if an obstacle is within a second radial zone of the vehicle based on the state (e.g., occupancy) of the composite grid. The second radial zone may extend between an intermediate radius and an inner radius. If the obstacle is present within the second radial zone, the method continues with step S506. However, if the obstacle is not present within the second radial zone, the method continues with step S508.

In step S506, the guidance module 24 decreases the vehicular speed or velocity to a target speed or target velocity, or below the target speed or target velocity. The target speed or target velocity may be based on maintaining a desired degree of separation between the vehicle and the obstacle. The guidance module 24 may send a command to the propulsion system 28, the braking system 30, or both to reduce the vehicular speed or velocity.

In step S508, a guidance module 24 determines if an obstacle is within a third radial zone of the vehicle based on the state (e.g., occupancy) of the composite grid. The third radial zone extends between an inner radius and approximately zero radius from the vehicle. If the obstacle is present within the third radial zone, the method continues with step S510. However, if the obstacle is not present within the third radial zone, the method continues with step S512.

In step S510, the guidance module 24 stops the vehicle or changes the vehicular direction of travel or the vehicle heading to avoid a collision with the obstacle or to otherwise meet safety objectives. For example, if the current vehicular direction qualifies as an estimated potential or actual collision course with the obstacle in the third radial zone, the guidance module 24 may institute any appropriate evasive measure, including stopping the vehicle, turning the vehicle, or both. The guidance module 24 may command the braking system 30 to apply maximum braking power or force or to even reverse thrust of the propulsion system 28 to slow or stop the vehicle in step S510.

In step S512, the vehicle continues at any permitted vehicular velocity or acceleration vector.

Figure 8:
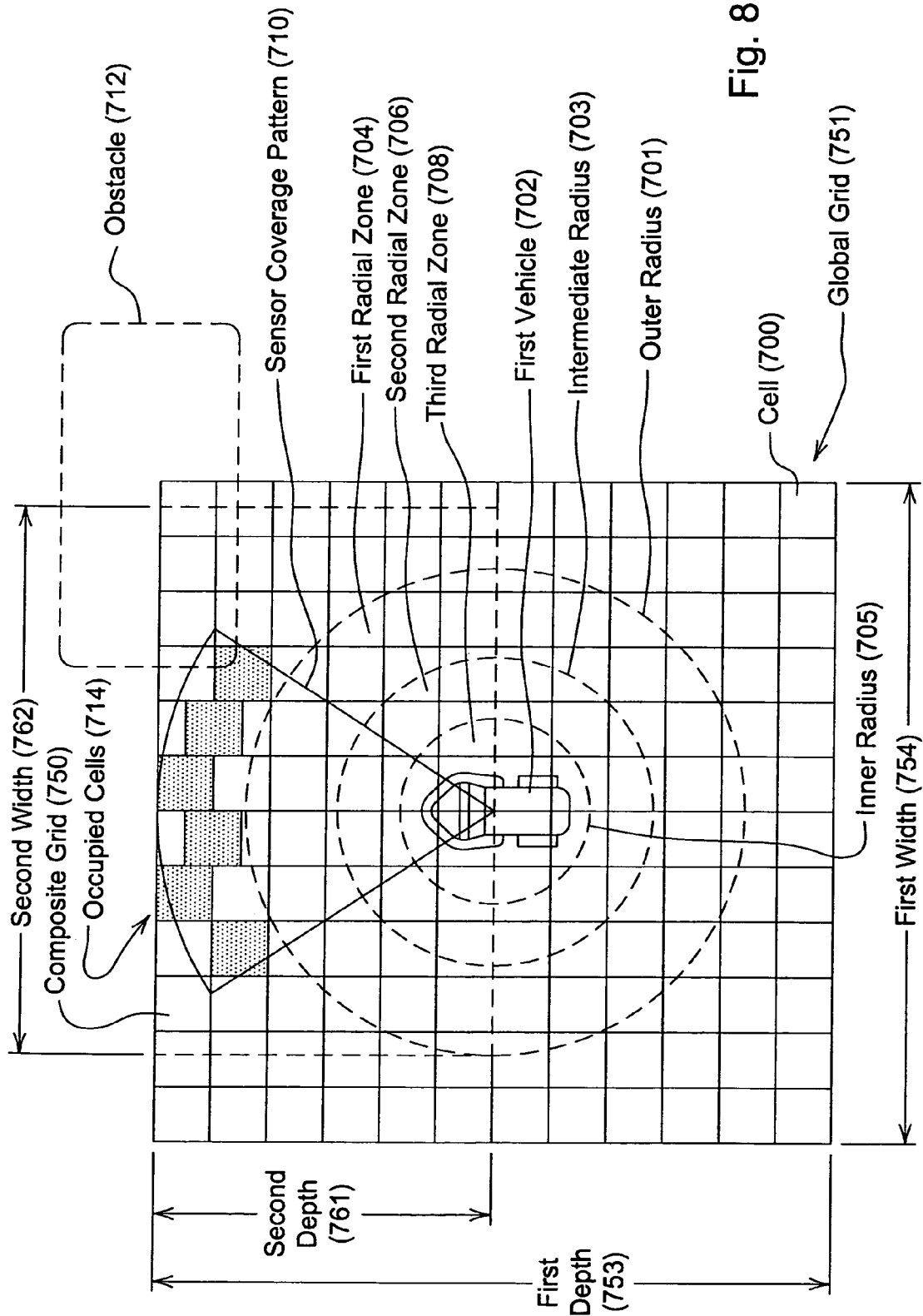
FIG. 8 is a diagram that illustrates a plan view of a vehicle associated with a composite grid (e.g., an occupancy grid) in accordance with the invention.

FIG. 8 represents the implementation of a composite grid 750 for sensor fusion. FIG. 8 shows a plan view of the first vehicle 702 associated with a composite grid within a global grid 751. The global grid 751 has a first depth 753 and first width 754. The composite grid 750 has a second depth 761 and a second width 762, which are less than or equal to the first depth 753 and the first width 754.

A first vehicle 702 is present in the center of the global grid 751 and is moving upwards toward an obstacle 712 (e.g. a second vehicle). The first vehicle 702 has a data processing system (11 or 111) that transmits pulses or other electromagnetic radiation in a sensor coverage pattern 710 or radiation pattern. The transmitted pulses are reflected by the obstacle 712. The reflection of the transmitted pulse from the vehicle is processed by an algorithm (eg, a sensor-specific algorithm) in the data processing system (11 or 111) to update the values of the composite grid cells 700 in the beam width of the sensor(s) (e.g., 10 and 14). The difference between the transmission time of propagation of the transmitted pulse and the reception time of the reflected pulse is used to estimate the distance of the obstacle 712 with respect to the first vehicle 702. The composite grid illustrates the occupied cells 714 for a first scan as shaded in FIG. 8.

In FIG. 8, the circles around the first vehicle 702 define the boundaries or perimeters of areas or zones of sensitivity to the presence of obstacles (e.g., 712). A first radial zone 704 is defined or bounded by an outer radius 701 and an intermediate radius 703. A second radial zone 706 is defined by or bounded by an intermediate radius 703 and an inner radius 705. A third radial zone 708 is defined by or bounded by an inner radius 705 and a substantially zero radius about the vehicle.

If an obstacle 712 is present in the first radial zone 704 in accordance with a composite grid, the obstacle 712 may cause no change in the path of vehicle, because the guidance module 24 estimates that a collision course is impossible within an evaluation time period given the position, velocity and acceleration of the vehicle, and an estimated position, maximum velocity, and maximum acceleration of the obstacle. If an obstacle 712 is present in the second radial zone 706 in accordance with the composite grid, the guidance module 24 may instruct the propulsion system 28 or the braking system 30 to slow the vehicle or reduce its velocity. If an obstacle 712 is present in the third radial zone 708, in accordance with the composite grid, the guidance module 24 may instruct the propulsion system 28 and the braking system 30 to stop the vehicle. Although FIG. 7 appears to consider the first radial zone 704, followed by the second radial zone 706, and finally the third radial zone 708, the steps may be executed in any suitable order. For example, the third radial zone 708 may be considered first to provide more processing time than might otherwise be allotted.

The use of the composite grid for the fusion and integration of sensor data presents advantages in several areas. First, because the grid is local in scope and limited to regions of sensor readings, it tolerates position and orientation errors better than a global map or global rid. Absolute positioning errors can create artifacts or other false information in a global map. These artifacts can last for a sufficiently length (depending on the memory parameters of the map) to disturb the operation of the vehicle or cause unnecessary inefficiencies in the behavior of the vehicle. Instead, the composite map will renew itself and discard the artifacts as soon as the vehicle moves a material amount. Second, the ability of fusion and integration are available even when absolute sources of position fail. That is, the first sensor 10 readings and the second sensor 14 readings may be spatially and temporally aligned and integrated with reference to the vehicle coordinate frame, as opposed to the ground or another coordinate frame. Many vehicles may rely on odometry for short term relative positioning. This generally suffices to meet the positioning and orientation requirements to keep the composite grid map up to date. Third, because the map is fixed to vehicle coordinates, it is possible to calculate the mapping between the sensor and the map cells during system initialization and avoid complex geometry calculations during run time. This is amenable to lower capacity processors.

Having described the preferred embodiment, it will become apparent that various modifications can be made without departing from the scope of the invention as defined in the accompanying claims.

The invention claimed is:

1. A method for detecting an obstacle based on sensor fusion, the method comprising:
    collecting a first group of first sensor readings of a first size by transmitting a first electromagnetic signal, capable of reflection from an obstacle, from a vehicle at a transmission time and by receiving a reflection of the first electromagnetic signal from the obstacle at the vehicle at a reception time, the first sensor readings based on an elapsed time between the transmission time and the reception time;
    collecting a second group of second sensor readings of a second size using a second electromagnetic signal or an ultrasonic signal;
    referencing the first group and the second group of readings to a vehicle coordinate reference frame;
    establishing a composite grid referenced to vehicle coordinate reference frame or ground based on a spatially and temporally aligned integration of the readings of the first group and the second group, the composite grid comprising a multi-dimensional array of cells, each cell associated with an overall state of occupancy; and
    refreshing the composite grid for obstacle detection upon the sooner of a regular update interval or material movement of the vehicle such that the overall state of each cell in the composite grid varies in accordance with the particular location of the vehicle in the environment.

2. The method according to claim 1 further comprising:
    determining whether material movement of the vehicle is detected by a location-determining receiver with a dilution of precision as the desired degree of reliability; and
    refreshing the composite grid in accordance with the material movement detected by the location-determining receiver if position data of the location-determining receiver meets or exceeds a desired degree of reliability.

3. The method according to claim 1 further comprising:
    determining whether material movement of the vehicle is detected by a location-determining receiver with a desired degree of reliability; and
    refreshing the composite grid in accordance with the material movement detected by at least one of an odometer, a dead-reckoning system and an accelerometer if position data of the location-determining receiver fails to meet a desired degree of reliability.

4. The method according to claim 1 wherein the establishing further comprises:
    determining a first mapping of the first group of first sensor readings with respect to the composite occupancy grid;
    determining a second mapping of the second group of second sensor readings with respect to the composite occupancy grid; and
    establishing a composite grid reference to the vehicle coordinate reference frame or a ground reference frame, where the composite grid is based on the first mapping and the second mapping.

5. The method according to claim 1 wherein the first mapping and the second mapping are determined during initialization of a data processing system.

6. The method according to claim 1 further comprising:
    maintaining a current vehicular heading via a steering system of the vehicle if an obstacle is present in a first radial zone based on the composite grid.

7. The method according to claim 1 further comprising:
    decreasing a vehicular speed or velocity of the vehicle to a target speed or velocity via at least one of a propulsion system and a braking system of the vehicle if an obstacle is present within a second radial zone associated with the vehicle based on the composite grid; the second radial zone having a lesser radius from the vehicle than a first radial zone.

8. The method according to claim 1 further comprising:
    stopping movement of the vehicle via a braking system of the vehicle if an obstacle is present within a third radial zone associated with the vehicle based on the composite grid or if a current vehicular direction qualifies as an actual or potential collision course with the obstacle; the third radial zone having a lesser radius than a first radial zone and a second radial zone.

9. The method according to claim 1 wherein the material movement comprises a movement of the vehicle that is greater than or equal to some fraction of a cell width, cell height, or another cell dimension.

10. The method according to claim 1 wherein the refreshed composite grid comprises output data for control or guidance of the vehicle by a vehicle data processing system or a driver of the vehicle.

11. The method according to claim 1 wherein the material movement is determined with a corresponding desired degree of reliability.

12. The method according to claim 1 wherein the composite grid comprises a composite occupancy grid and wherein the overall state comprises at least one of an occupied state, an unoccupied state, a probability of occupancy, and a probability of non-occupancy.

13. The method according to claim 12 further comprising:
    determining a guidance plan based the presence of one or more obstacles in accordance with the composite grid.

14. A system for detecting an obstacle based on sensor fusion, the system comprising:
    a first sensor for collecting a first group of first sensor readings of a first size by transmitting a first electromagnetic signal, capable of reflection from an obstacle, from a vehicle at a transmission time and by receiving a reflection of the first electromagnetic signal from the obstacle at the vehicle at a reception time, the first sensor readings based on an elapsed time between the transmission time and the reception time;

a second sensor for collecting a second group of second sensor readings of a second size using a second electromagnetic signal or an ultrasonic signal;

a reference frame manager for referencing the first group and the second group of readings to a vehicle coordinate reference frame;

an integration module for establishing a composite grid referenced to vehicle coordinate reference frame or ground based on a spatially and temporally aligned integration of the readings of the first group and the second group, the composite grid comprising a multidimensional array of cells, each cell associated with an overall state of occupancy; and an update module for refreshing the composite grid for obstacle detection upon the sooner of a regular update interval or material movement of the vehicle such that the overall state of each cell in the composite grid varies in accordance with the particular location of the vehicle in the environment.

15. The system according to claim 14 further comprising a location-determining receiver for determining position data associated with the vehicle; wherein the update module is arranged to refresh the composite grid in accordance with the material movement detected by the location-determining receiver if position data of the location-determining receiver meets or exceeds a desired degree of reliability.

16. The system according to claim 14 wherein the update module is arranged to refresh the composite grid in accordance with the material movement detected by at least one of an odometer, a dead-reckoning system and an accelerometer if position data of the location-determining receiver fails to meet a desired degree of reliability.

17. The system according to claim 14 further comprising:
a steering system of the vehicle;
a guidance module for maintaining current vehicular heading via the steering system if an obstacle is present in a first radial zone based on the composite grid.

18. The system according to claim 14 further comprising:
a propulsion system of the vehicle;
a braking system of the vehicle;
a guidance module for decreasing a vehicular speed or velocity of the vehicle to a target speed or velocity via at least one of the propulsion system and the braking system if an obstacle is present within a second radial zone associated with the vehicle based on the composite grid; the second radial zone having a lesser radius from the vehicle than a first radial zone.

19. The system according to claim 14 further comprising:
a braking system of the vehicle;
a guidance module for stopping movement of the vehicle via the breaking system if an obstacle is present within a third radial zone associated with the vehicle based on the composite grid or if a current vehicular direction qualifies as an actual or potential collision course with the obstacle; the third radial zone having a lesser radius than a first radial zone and a second radial zone.

20. The system according to claim 14 wherein the material movement comprises a movement of the vehicle that is greater than or equal to some fraction of a cell width, cell height, or another cell dimension.

21. The system according to claim 14 wherein the refreshed composite grid comprises output data for control or guidance of the vehicle by a vehicle data processing system or a driver of a vehicle.

22. The system according to claim 14 wherein the material movement is determined with a corresponding desired degree of reliability.

23. The system according to claim 14 wherein the composite grid comprises a composite occupancy grid and wherein the overall state comprises at least one of an occupied state, an unoccupied state, a probability of occupancy, and a probability of non-occupancy.

24. The system according to claim 23 further comprising:
a guidance module for determining a guidance plan based the presence of one or more obstacles in accordance with the composite grid.

25. The system according to claim 14 wherein the integration module determines a first mapping of the first group of first sensor readings with respect to the composite occupancy grid and a second mapping of the second group of second sensor readings with respect to the composite occupancy grid.

26. The system according to claim 25 wherein the first mapping and the second mapping are determined during initialization of the system.

* * * * *